March 24, 1970     J. A. McAVOY     3,502,912
TEMPERATURE AND VOLTAGE COMPENSATED MULTIVIBRATOR
Filed Nov. 9, 1965     2 Sheets-Sheet 1

INVENTOR.
JOHN A. McAVOY.

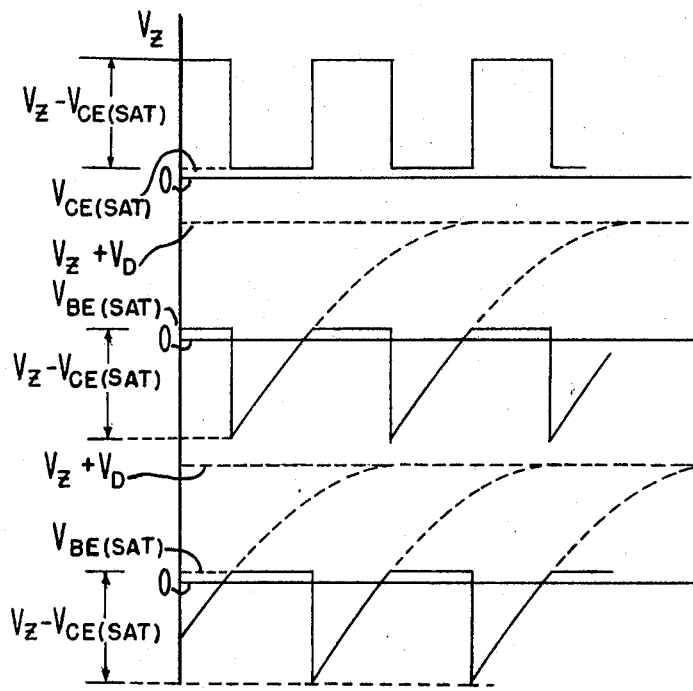
*Fig.5A.* COLLECTOR VOLTAGE
*Fig.5B.* BASE VOLTAGE
*Fig.5C.* BASE VOLTAGE
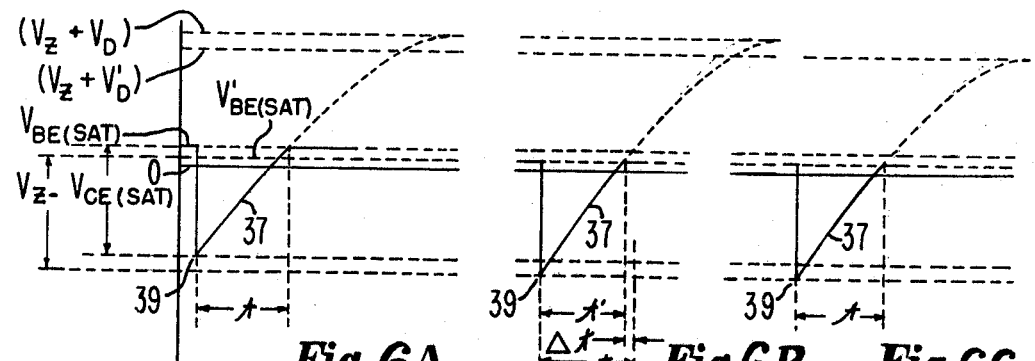
*Fig.6A.*   *Fig.6B.*   *Fig.6C.*
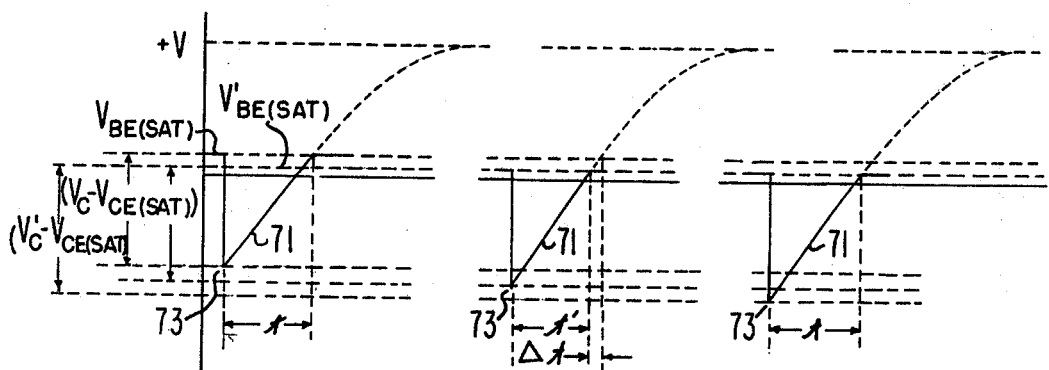
*Fig.6D.*   *Fig.6E.*   *Fig.6F.*

United States Patent Office 3,502,912
Patented Mar. 24, 1970

3,502,912
TEMPERATURE AND VOLTAGE COMPENSATED MULTIVIBRATOR
John A. McAvoy, Detroit, Mich., assignor to Burroughs Corporation, a corporation of Michigan
Filed Nov. 9, 1965, Ser. No. 506,951
Int. Cl. H03k *3/26, 3/28*
U.S. Cl. 307—273                                   6 Claims

ABSTRACT OF THE DISCLOSURE

A circuit compensating for variations in the triggering voltage levels of active elements, and more particularly compensating for temperature dependent variations in the triggering voltage level in a multivibrator. In addition, means for establishing a point of constant potential is used for maintaining constant current through the temperature compensation means, and the temperature compensation means and constant potential establishing means are connected in series to block negative spikes and positive spikes from the power supply thereby isolating the multivibrator.

---

Temperature dependent triggering level changes in electronic components cause severe problems in electronic timing circuit design. Usually these circuits include an active element having a discrete triggering voltage level which, however, often varies with temperature. The period of the circuit is determined by the time necessary for the voltage at the input terminal to reach this triggering level. Obviously, the period changes also, as it takes a greater or lesser amount of time for the voltage at the input terminal to reach the triggering level, which has varied with temperature.

The problem is especially acute in data processing machines, were calculations are performed in periods of microseconds, and the solution of a single problem may require hundredths of thousands or even millions of calculations. The timing of these operations is performed with clock circuits which emit a constant frequency pulse train. It is very important that the repetition frequency of the pulse train remain invariant, so that the operations in the data processor are performed in correct sequence, and so that the machine operates at top design speed, but not faster.

Most timing circuits used in modern data processing machines are made up of solid state components which, as a rule, are affected more by temperature changes than space discharge devices. Astable transistor multivibrators are used quite commonly as clock circuits in these machines. The frequency of the multivibrator is usually determined by the exponential charge path of the capacitor of an RC timing circuit which forms a part of the multivibrator. In the most common type of astable transistor multivibrator circuits, the timing capacitors are coupled to the base of the transistors and the multivibrator switches from one state to the other when a capacitor reaches the triggering voltage level of the transistor to which it is coupled. The base to emitter triggering voltage of a transistor decreases with increasing temperature. Thus, when the temperature increases, the transistor is triggered sooner, and the frequency of the multivibrator increases.

The problem of temperature dependent triggering voltage level changes causing variation in the timing of electronic circuits is not confined to astable multivibrators. The problem also appears in monostable multivibrators and many other circuits with various states of seriousness, depending on the degree of accuracy needed in the timing.

Variations in the supply voltage also have an adverse effect on the stability of the frequency of timing circuits by causing changes in the bias voltages and in the charge paths of the capacitor in the RC circuit.

It is therefore an object of my invention to stabilize the period of timing circuits.

It is a further object of my invention to compensate for temperature dependent variations in the triggering level of active elements in timing circuits.

It is a further object of my invention to compensate for voltage and temperature dependent variations in the period of timing circuits.

It is a still further object of my invention to provide a circuit to hold constant the time necessary for the voltage on the capacitor of an RC timing circuit coupled to an active element to reach the triggering voltage of the active element.

In carrying out these and other objects of my invention, I provide a temperature variant element for compensating for temperature dependent triggering voltage level changes in an active switching element where the triggering voltage is provided by an RC timing circuit coupled to the input terminal of the active element. The temperature variant compensating element is coupled to the RC timing circuit for changing one end point of the charge path for holding constant the time necessary for the voltage at the input terminal of the switching element to reach the triggering level. The time constant of the RC circuit remains the same.

Various other objects, advantages, and features of my invention will become more fully apparent from the following specification with its appended claims and accompanying drawings, in which:

FIGS. 5A through 5C show waveforms at various points in the circuit of FIG. 1 and FIG. 3.

FIGS. 6A through 6F are graphs showing the effect of the temperature compensation on the base to emitter voltage waveforms in the circuits of FIG. 1 through FIG. 4.

My invention can best be understood by referring to the following detailed description of the illustrated embodiments.

The compensating circuit of my invention will be discussed in relation to astable and monostable multivibrator circuits, but it should be obvious that my invention is equally useful for stabilizing the timing of other triggering circuits which include active elements having temperature variant triggering voltages.

Figure 1:
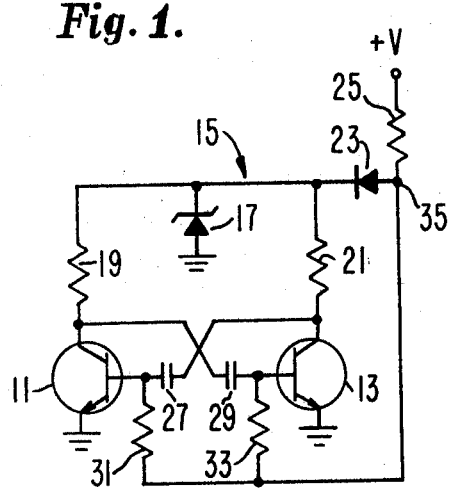
FIG. 1 shows the preferred embodiment of my invention in an astable multivibrator clock circuit.

Referring to FIG. 1 of the drawings, the collectors of transistors 11 and 13 of astable multivibrator 15 are connected to the cathode of Zener diode 17 by resistors 19 and 21, respectively. The cathode of Zener diode 17 is also connected to the cathode of temperature compensating diode 23. The anode of Zener diode 17 is grounded, and the anode of temperature compensating diode 23 is connected to voltage source +V through resistor 25. The base of transistor 11 is coupled to the collector of transistor 13 through capacitor 27. Capacitor 29 couples the base of transistor 13 to the collector of transistor 11. The bases of transistors 11 and 13 are also connected to the junction of temperature compensating diode 23 and resistor 25 through resistors 31 and 33, respectively. The emitters of the transistors are grounded.

The circuit of FIG. 1 is an astable multivibrator having collector voltage waveforms as shown in FIG. 5A. The transistors 11 and 13 turn on and off alternately, with the switching on of one transistor turning off the other transistor through the capacitor coupling the collector of the first transistor to the base of the second transistor. The repetition frequency of the multivibrator is determined by the time constant of the RC circuits made up of coupling capacitors 27 and 29 and resistors 31 and 33, respectively.

The waveforms which exist at the base of the transistors are shown in FIGS. 5B and C. When transistor 11 turns on, its collector voltage drops from the Zener voltage $V_z$ to the collector saturation voltage $V_{ce(sat)}$. This drop is coupled to the base of transistor 13 through capacitor 29 and causes the base voltage to drop by the same amount from the base saturation voltage $V_{be(sat)}$ to a much lower voltage, as seen in FIG. 5B, thereby turning transistor 13 off. It is an important design consideration for the multivibrator that Zener diode 17 be chosen so that its voltage $V_z$ is not enough to reverse bias the base of the transistors beyond their breakdown point. The capacitor 29 then begins to charge exponentially through resistor 33 and transistor 11 towards the voltage at point 35 at a time constant determined by the value of capacitor 29 and resistor 33. The voltage at point 35 is equal to the Zener voltage $V_z$ plus the voltage drop across diode 23 $V_d$. When the voltage at the base of the transistor 13 reaches the triggering voltage, which is equal to the base to emitter saturation voltage $V_{be(sat)}$, the transistor 13 starts to turn on. This switches the multivibrator 15 regeneratively to the opposite state, with transistor 13 on and transistor 11 off. The voltage at the base of transistor 13 remains at $V_{be(sat)}$ until the multivibrator 15 switches back again. A similar voltage waveform which is shifted in time by one-half the period of multivibrator 15 exists at the base of transistor 11, as seen in FIG. 5C with transistor 11 turning off as transistor 13 turns on.

Referring now to FIGS. 6A, B, and C, it is seen that as temperature varies, the triggering voltage $V_{be(sat)}$ at the base of the transistors also varies, with the triggering voltage decreasing from $V_{be(sat)}$ to $V'_{be(sat)}$ as the temperature increases. The drop in voltage $[V_z - V_{ce(sat)}]$ at the collectors of the transistors when they turn on remains constant with increasing temperature, so that the bases of the transistors are driven the same distance into cutoff in FIG. 6B as they are at lower temperatures in FIG. 6A. However, the beginning point 39 of the charge path 37 is shifted downwardly and therefore, as shown in FIG. 6B, the difference between the starting point 39 and the finishing voltage of the charge path is increased. This increases the slope of the charge path 37 and decreases the time $t$ necessary for the voltage at the base of the transistors to reach the triggering level $V_{be(sat)}$ to a time $t'$ which is less than $t$ by an amount $\Delta t$. The frequency of the multivibrator 15 therefore increases.

To prevent this, temperature compensating diode 23 is included in the circuit. Zener diode 17 and resistor 25 form a voltage regulating circuit with voltage source $+V$. Temperature compensating diode 23 is connected in series with this circuit between the Zener diode 17 and resistor 25. It is continuously forward biased and receives a regulated current, since one side of the multivibrator 15 is always on, and a constant current flows through Zener diode 17. This establishes a point of constant potential at the junction of the cathode of Zener diode 17 and the cathode of diode 23. Thus, temperature compensation diode 23 remains at one point on its operating characteristic at all times. The diode 23 is chosen so that it has the same temperature characteristic as the base to emitter junction of the transistors 11 and 13.

As the base to emitter saturation voltage $V_{be(sat)}$ of the transistors drops with increasing temperature, the forward voltage drop $V_d$ across diode 23 also decreases at the same rate, thereby lowering the voltage at point 35 and decreasing the voltage towards which the capacitors of the timing circuits charge. This lowers the finish point $[V_z + V_d]$ of the charging path 37 of the capacitors to $[V_z + V'_d]$ as shown in FIG. 6C and decreases the slope of the charging path 37 to the same value as it is at lower temperatures. Thus the capacitors still take the proper amount of time $t$ to reach the triggering level $V_{be(sat)}$ of the transistors and the frequency of the multivibrator 15 remains constant.

Figure 2:
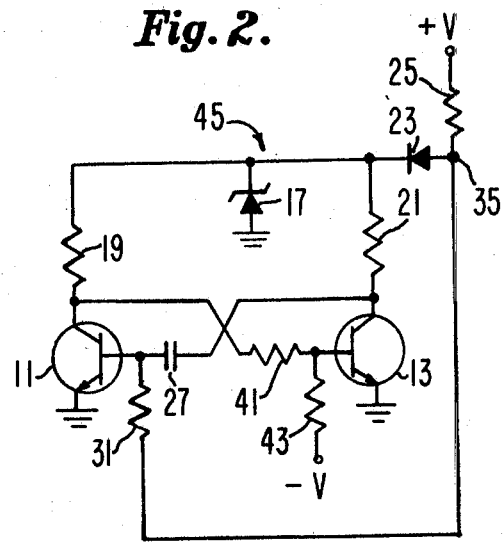
FIG. 2 shows the preferred embodiment of my invention in a monostable multivibrator circuit.

FIG. 2 of the drawing illustrates the same embodiment of my invention as FIG. 1, but in a monostable multivibrator configuration. The circuits are quite similar so that corresponding components are numbered identically. The only differences in the circuits are that the collector of transistor 11 is coupled to the base of transistor 13 through resistor 41 instead of through capacitor 29, and also instead of resistor 33 being coupled to point 35, it is replaced with resistor 43, which is connected to negative voltage source $-V$. In the stable state of the monostable multivibrator 45, the transistor 11 is on and transistor 13 is off. When the multivibrator 45 is switched to the unstable state with the transistor 13 on and the transistor 11 off, the voltage waveform at the base of transistor 11 is exactly the same as in the astable multivibrator configuration described above, and the temperature compensation diode 23 operates in exactly the same manner to stabilize the period of the unstable state.

Zener diode 17 also provides protection for the transistor from positive going variations in the supply voltage. If any spikes appear in the value of the voltage source $+V$, they are dissipated across the voltage dropping resistor 25 and the voltage at the cathode of Zener diode 17 remains at the constant regulated value. Negative going voltage spikes are blocked by temperature compensating diode 23.

Figure 3:
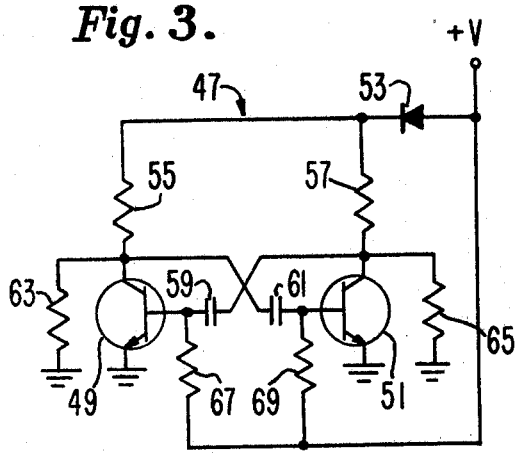
FIG. 3 shows an alternate embodiment of my invention in an astable multivibrator clock circuit.
Figure 4:
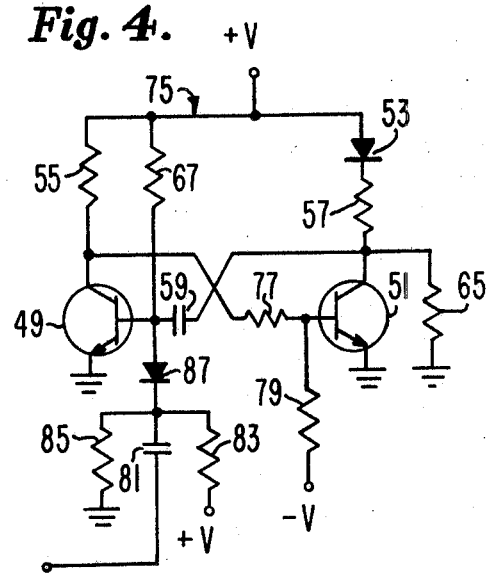
FIG. 4 shows the alternate embodiment of FIG. 3 in a monostable multivibrator circuit.

An alternate embodiment of my invention is illustrated in FIGS. 3 and 4. FIG. 3 depicts an astable multivibrator circuit 47 comprising transistors 49 and 51, whose collectors are coupled to the cathode of temperature compensating diode 53 through resistors 55 and 57 respectively. The anode of temperature compensating diode 53 is connected to voltage source $+V$. The base of transistor 49 is coupled to the collector of transistor 51 through capacitor 59. The base of transistor 51 is coupled to the collector of transistor 49 through capacitor 61. The emitters of both transistors are grounded. Resistor 63 is connected between the collector of transistor 49 and ground, thereby providing a voltage divider with resistor 55. Another voltage divider is completed by resistor 65, which is connected between the collector of transistor 51 and ground. The bases of transistors 49 and 51 are coupled to voltage source $+V$ through resistors 67 and 69, respectively.

Astable multivibrator 47 operates in much the same manner as astable multivibrator 15 of FIG. 1, except that the voltage dropping effect of resistor 25 and Zener diode 17 of multivibrator 15 and the continuous, constant forward biasing of temperature compensating diode 23 of multivibrator 15 are achieved in multivibrator 47 by the voltage divider resistors 63 and 65 connected between the collectors of the transistors and ground. The collectors of transistors 49 and 51 do not experience the full voltage at the cathode of diode 53 when they are off, but a lesser voltage $V_c$ determined by the relative values of collector resistors 55 and 57 to voltage divider resistors 63 and 65.

If temperature compensation were not provided for the circuit, it would experience similar temperature dependent frequency variations as were described in relation to FIGS. 6A and B for multivibrator 15 of FIG. 1. Referring to FIGS. 6D and E of the drawings, the base to emitter saturation voltage would decrease from $V_{be(sat)}$ to $V'_{be(sat)}$, absent temperature compensation; however, the voltage to the base of the transistor, which cuts off the transistor, remains constant at $[V_c - V_{ce(sat)}]$. As in the case of multivibrator 15, the distance between the start and finish points of the charge path of the capacitors is thereby increased so that the slope of the charge path 71 is increased, and the time necessary for the voltage at the base of the off transistor to reach the reduced triggering level $V'_{be(sat)}$ is decreased from the proper time $t$ by an amount $\Delta t$ to a lesser time $t'$.

The solution to the problem in this embodiment is to further lower the starting point 73 of the charge path 71.

The effect of temperature compensating diode 53 on the circuit can be best seen from FIGS. 6D and F. When temperature increases, the forward voltage drop across temperature compensating diode 53 decreases, thereby increasing the voltage at its anode and also increasing the maximum collector voltage $V_c$ experienced by transistors 49 and 51 to a larger value $V'_c$. Since the amount that the bases of the transistors are driven into cutoff is equal to the drop in the collector voltage from $V'_c$ to $V_{ce(sat)}$ of the other transistor when it is switched on, it is driven further into cutoff because the $V_{ce(sat)}$ of the transistors remains relatively constant with variations in temperature. Thus, when the triggering voltage decreases with increasing temperature, tending to decrease the time required for the capacitor to charge to the triggering voltage, the starting point 73 of the charge path 71 is made even more negative than it would be without the action of diode 53, as seen in FIG. 6F. This holds the time necessary for the voltage at the base of the transistor at the proper interval $t$.

It is to be noted that an added and novel advantage of my invention, when used in the astable multivibrators 15 and 47, is that a single diode compensates for the temperature variation in the triggering voltage level of both transistors. Temperature compensating diode 53 also blocks negative noise pulses from reaching the multivibrator 47 and damaging its components.

The monostable multivibrator 75 of FIG. 4 is similar to the astable multivibrator 47 in FIG. 3, and corresponding elements have been numbered similarly. The changes in the cross-coupling which are required are that coupling capacitor 61 is replaced by resistor 77 and resistor 69 is replaced by resistor 79, which is connected between the base of transistor 51 and negative voltage source −V. Resistor 63, which was connected between the collector of transistor 49 and ground, is also removed and resistor 55 is now connected to the anode of diode 53.

The circuit operates as an ordinary monostable multivibrator with transistor 49 on and transistor 51 off in the stable state. An input triggering circuit is provided for the multivibrator 75. The input signal is fed into capacitor 81. The other side of capacitor 81 is attached to the junction of resistors 83 and 85. The other ends of resistors 83 and 85 are attached to voltage source +V and ground, respectively. The cathode of diode 87 is also attached to the junction of resistors 83 and 85. The anode of diode 87 is connected to the base of transistor 49. The voltage divider formed by resistors 83 and 85 back biases diode 87 so that it requires a negative input signal higher than the amount of the back biasing to turn transistor 49 off and switch multivibrator 75 to its unstable state. This circuit has the feature of preventing the multivibrator from being triggered accidentally by noise in the circuit.

When the multivibrator 75 is switched to the unstable state, its period is determined by the timing circuit comprised of resistor 67 and capacitor 59. The temperature compensation is provided in exactly the same manner as in FIG. 3, with temperature compensating diode 53 connected between voltage source +V and resistor 57. It is coupled only to one side of the multivibrator 75, as there is only one coupling capacitor 59, whose charge path must be controlled.

A trigger circuit (not shown) is also provided for the monostable multivibrator of the first embodiment of my invention. It may be of the same type as was described immediately above or any other type, the only criteria being that it either turn transistor 11 off or transistor 13 on and not interfere with the operation of the circuit. Trigger circuits may also be provided, if desired, for astable multivibrators 15 and 47.

Although my invention has been described with reference to an RC timing circuit, it is apparent that other timing circuits can be used. For instance, an LR timing circuit having its resistor coupled between the base emitter junctions of the transistor would also work, with the current through the resistor causing the same voltage build-up path as the charge path of the capacitor.

Of course my invention works equally well to compensate for colder temperatures; when the temperature drop $V_{be(sat)}$ increases, this is offset by a corresponding increase in $V_d$ and the period of the circuit is held constant.

It is to be understood that the foregoing description is by way of illustration only, and, as will be obvious to one skilled in the art, my invention may find uses in many circuits other than multivibrators. It has potential applicable to any timing circuit having an active element with a temperature dependent triggering voltage and an RC timing circuit coupled to the input terminal for controlling the timing of the circuit.

I claim:
1. A compensated multivibrator comprising:
first and second active elements, said active elements having a temperature dependent triggering voltage level at an input terminal,
an RC timing circuit having a capacitor coupling said first active element to the input of said second active element for turning off said second active element when said first active element turns on and for turning on said second active element when the voltage of said capacitor reaches the triggering level of said second active element,
means for compensating the temperature variations of said multivibrator triggering voltage level, said temperature compensation means being resistively coupled timing circuit for varying one endpoint of the charge across said capacitor, and
means for establishing a point of constant potential for stabilizing the current through said temperature compensation means, said constant potential establishing means being resistively coupled to one terminal of said capacitor and across said multivibrator, and said constant potential establishing means being connected in series with said temperature compensating means.

2. The multivibrator of claim 1 wherein said temperature compensation means is in parallel with said timing circiut and holds constant the time necessary, after the second active element is turned off, for the timing circuit to reach the triggering level of said second active element.

3. The multivibrator of claim 2 wherein said temperature compensating means includes a forward biased diode.

4. The multivibrator of claim 3 wherein said active elements are transistors.

5. The multivibrator of claim 1 wherein said constant potential establishing means comprises a Zener diode.

6. The multivibrator of claim 5 wherein said Zener diode is connected to the collectors of both transistors for holding the collector voltages constant.

References Cited

UNITED STATES PATENTS

| 3,178,658 | 4/1965 | Henrion | 331—113 XR |
| 3,239,779 | 3/1966 | Rywak | 331—113 |
| 3,246,258 | 4/1966 | Boreen | 331—113 |
| 3,264,579 | 8/1966 | Marcus | 331—113 |
| 3,283,263 | 11/1966 | Kalmus et al. | 307—310 XR |
| 3,320,551 | 5/1967 | Miller | 307—310 XR |

STANLEY D. MILLER, Primary Examiner

U.S. Cl. X.R.

307—310; 331—113.

PO-1050
(5/69)

UNITED STATES PATENT OFFICE
CERTIFICATE OF CORRECTION

Patent No. 3,502,912          Dated March 24, 1970

Inventor(s) John A. McAvoy

It is certified that error appears in the above-identified patent and that said Letters Patent are hereby corrected as shown below:

Column 6, lines 38 & 39, after "coupled" delete --timing circuit for varying one endpoint of the charge--.

SIGNED AND
SEALED
AUG 25 1970

(SEAL)
Attest:

Edward M. Fletcher, Jr.
Attesting Officer

WILLIAM E. SCHUYLER, JR.
Commissioner of Patents